(12) United States Patent
Chen

(10) Patent No.: US 7,218,459 B2
(45) Date of Patent: May 15, 2007

(54) ZOOM LENS ASSEMBLY

(75) Inventor: Kun-Ming Chen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 11/106,552

(22) Filed: Apr. 15, 2005

(65) Prior Publication Data
US 2005/0286143 A1    Dec. 29, 2005

(30) Foreign Application Priority Data
Jun. 23, 2004    (CN) .............................. 93 1 18086

(51) Int. Cl.
*G02B 15/14* (2006.01)
(52) U.S. Cl. .................... 359/704; 359/694; 359/695
(58) Field of Classification Search ................. 359/704, 359/694, 695, 696, 699, 700, 701, 822, 823, 359/819, 811, 813
See application file for complete search history.

(56) References Cited

U.S. PATENT DOCUMENTS 5,959,786 A * 9/1999 Yamamoto et al. ......... 359/694
6,049,432 A     4/2000 Machida et al.
2003/0117725 A1* 6/2003 Nomura et al. ............. 359/819
2003/0128973 A1* 7/2003 Shinohara et al. ............ 396/25

* cited by examiner

*Primary Examiner*—Timothy Thompson
(74) *Attorney, Agent, or Firm*—Troxell Law Office, PLLC

(57) ABSTRACT

The present invention discloses a zoom lens assembly with capability of assuring concentricity of at least a lens group even during activity. The zoom lens assembly includes a plurality of optical lenses, at least two internal barrels, a lens holder and an alignment element wherein the lenses can be divided into at least two lens groups. The two internal barrels are used to respectively retain corresponding lens group therein to define a first and second lens sets. The lens holder is utilized to accommodate the first and second lens set therein. After twice alignment procedures in an assembled method, an internal barrel retained with one lens group is accommodated within the other internal barrel retained with another lens group to be precisely coupled. The two lens sets with mating structures are coupled to a guiding groove defined on the lens holder thereby the lens sets can slide inside the lens holder.

22 Claims, 5 Drawing Sheets

ZOOM LENS ASSEMBLY

BACKGROUND OF THE INVENTION

1. Field of the Invention

The present invention relates to a zoom lens assembly, and more specifically, to a zoom lens assembly adapted for an apparatus capable of projecting or photographing.

2. The Related Art

Due to successive developments on the recent electronic products, especially on a projecting and photographing apparatus, their essential corresponding optical elements have to be raised with great precision in compliance with the requirements of qualities and the optimum image effects. A common character appearing in the above apparatus should have an ability of how to implement optically zooming by using an optical lens. Physically, the lens has a utility of being moveable to carry out zooming in/out of an image. Therefore, made as an essential optical element of the above apparatus, the performance of any image is absolutely depended on whether the fabrication quality of the optical lens is great or not.

Generally speaking, a zoom lens assembly ordinarily comprises a lens system defined with a plurality of optical lenses with different curvatures. Furthermore, the plurality of optical lenses can be divided into at least two lens groups, which are respectively disposed within two corresponding internal barrels for constructing a first and second lens sets. Eventually, the lens sets are allocated within an external holder or an external barrel. Meanwhile, either the external holder or the external barrel insides are shaped suitable for the reciprocal and telescope movements of an internal barrel with respect to the external holder or the external barrel. The zoom lens assembly is consequently provided with a zooming capability. In optical industry, any one of the lens sets has to be kept extremely controlled in a concentric and coaxial manner, even many times during opposite movements between the lens sets, in order to prevent the lens sets from becoming eccentric or non-coaxial after the assembly to result in performance degradation.

A traditional zoom lens assembly has been disclosed in U.S. Pat. No. 6,049,432, as shown in FIG. 5 of the present specification. Meanwhile, a first lens group 90 and first lens holder 92 are constructed into a first lens set, and a second lens group 91 and second lens holder 93 are constructed into a second lens set. Both the first and second lens holders 92, 93 are mounted on a main frame 94. However the first and second lens holders 92, 93 mounted on the main frame 94, each uses only one spot to contact with a guide groove 95 for performing a telescopic movement, it may cause shakes while the lens holder is moving. Such a structure is not capable to completely ensuring that the first and second lens groups 90, 91 are moved oppositely along the same optical axis for all the time. Thus, it is hard to guarantee the optical performances of the zoom lens assembly. Besides, its fabricating method that the first and second lens groups 90, 91 are mounted on the main frame 94 separately will readily bring the fabricating quality more inaccuracies and degradation.

Understandably, it is necessary to provide a zoom lens assembly capable of assuring that each lens is coaxial with each other during moving oppositely or assembly.

SUMMARY OF THE INVENTION

An object of the present invention is to provide a zoom lens assembly capable of assuring that each lens is coaxial with each other and stabile even during oppositely moving and assembly. The image quality can be therefore raised and a simplified structure is incorporated for easily using and adjusting.

Another object of the present invention is to provide a zoom lens assembly that comprises at least two lens sets mated and slidable in response to each other, and a vent is formed on a main body of at least one of the lens set for resolving a problem of air pressure differentials occurred between the interior and exterior during the lens sets are telescoped.

A further object of the present invention is to provide a zoom lens assembly that comprises at least two lens sets mated and slidable in response to each other, and a shallow groove is formed on a precise sliding surface for providing the compactness of the sliding surfaces and diminishing the friction between the sliding surfaces.

According above objects of the present invention, there is provided a zoom lens assembly comprising a plurality of optical lenses, at least two internal barrels, a lens holder and an alignment element, wherein the lenses can be divided into at least two lens groups. The two internal barrels are used to retain corresponding lens group respectively and formed the first and second lens sets, and a portion of the internal barrel which retains one lens group is contained in the other internal barrel which retains another lens group after assembled. The lens holder is used to contain the first and second lens set. The alignment element can assure that each lens group of the lens set is in the same axis after assembled. The alignment element comprises at least a structure and a sliding device, wherein the structure is used for precisely coupling at least one portion of the two internal barrels. The sliding device utilizes at least a fastening device to combine the mating structure formed on two lens sets to a guiding groove on the lens holder, thereby the lens sets can slide in the lens holder.

There are two alignment procedures during the assembled process of the aforementioned zoom lens assembly. The first alignment procedure comprises mounting at least a portion of the second internal barrel which contains the second lens group into the first internal barrel which contains the first lens group, and at least a portion of the coupling structures of two internal barrels are precisely coupled. The first alignment procedure assures that each lens group keeps in the same axis while moving respectively. The second alignment procedure comprises mounting both the first and second lens sets which have be assembled into the lens holder and making each portion of two internal barrels to against the respective inner sidewalls of the lens holder for sliding along the guiding groove thereon.

The shallow groove is formed on the sliding surfaces between the two internal barrels for providing the compactness of the sliding surfaces and diminishing the sliding friction between the sliding surfaces in order to prevent the surfaces are stuck each other caused by the closely coupling of two internal barrels and good for the movement thereof. In addition, there is a vent formed on the sidewalls of the main body of one lens set for eliminating the pressure differentials between two lens sets to help the lens sets slide smoothly.

In contrast to the prior art, the zoom lens assembly according to the present invention assures that each lens keep in the same axis after assembled and increases the stability during moving mutually by the two alignments of the alignment element and the optical qualities thereof can be improved. Furthermore, since each lens group is combined into a single body already while mounting in the lens holder, the stability of the assembled process can be improved and the assembled procedures can be simplified to overcome the disadvantages of the conventional assembled method.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1A:
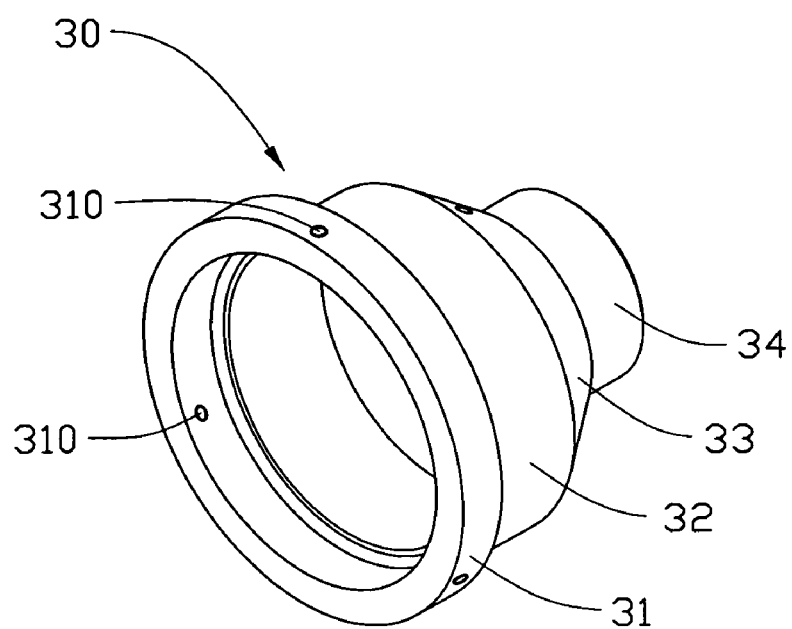
FIG. 1A is a schematic view of a first internal barrel of the zoom lens assembly in accordance with the present invention.
Figure 1B:
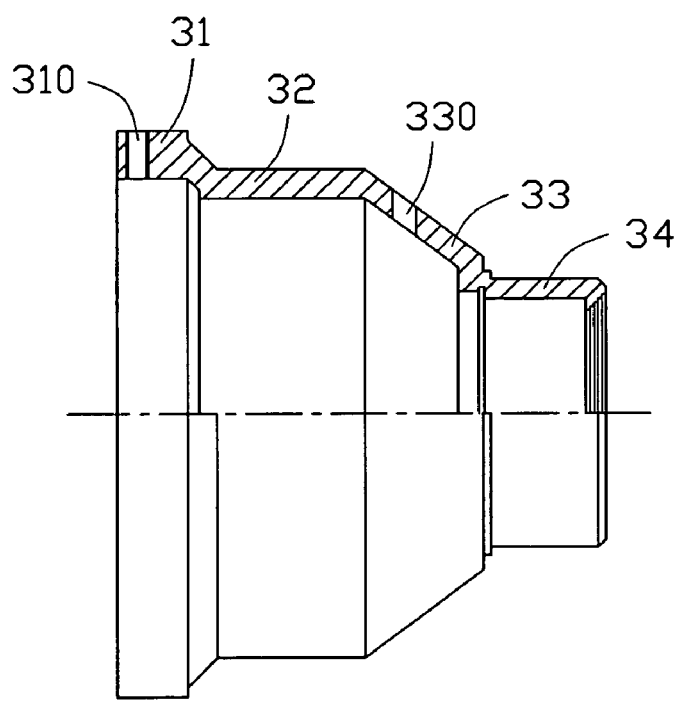
FIG. 1B is a cross-sectional view of the structure shown in FIG. 1A.

The present invention will now be described more specifically with reference to the following embodiments. It is to be noted that the following description of the preferred embodiments of the present invention are presented herein for purpose of illustration and description only and it is not intended to be exhaustive or to be limited to the precise form disclosed.

With reference to FIG. 1A to FIG. 4, a zoom lens assembly 1 according to a preferred embodiment of the present invention is disclosed. The zoom lens assembly 1 comprises a plurality of optical lenses divided into a first and second lens groups 10, 20, and a first and second internal barrels 30, 40. Meanwhile, the first lens group 10 (as a front lens group) is mounted in the first internal barrel 30 to form a first lens set and the rear lens group 20 (as a rear lens group) is mounted in the second internal barrel 40 to form a second lens set. After the two lens sets are assembled, the second internal barrel 40 disposed with the second lens group 20 is partially accommodated within the first internal barrel 30 disposed with the first lens group 10 (detailed later). Then both the lens sets are mounted in a lens holder 50 (or an external barrel). The lens holder 50 further has a guiding groove 51 extended through the inner and outer sidewalls thereof whereby the two lens sets can be slid, along the guiding groove 51, relative to each other, to perform a zooming function.

Figure 2A:
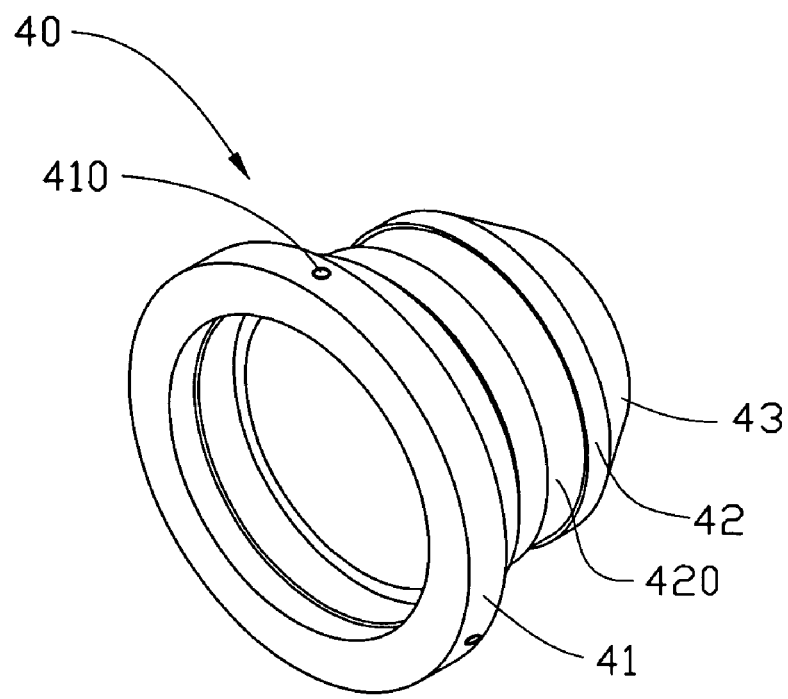
FIG. 2A is a schematic view of a second internal barrel of the zoom lens assembly in accordance with the present invention.
Figure 2B:
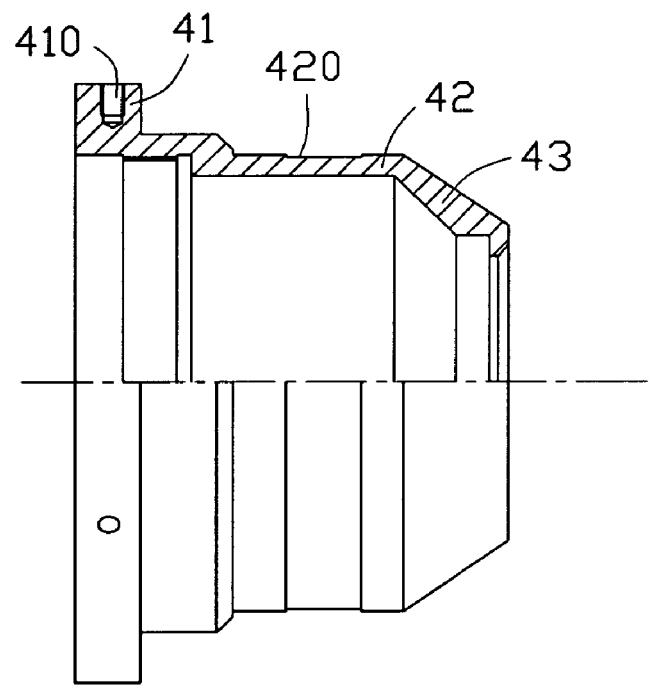
FIG. 2B is a cross-sectional view of the structure shown in FIG. 2A.
Figure 3:
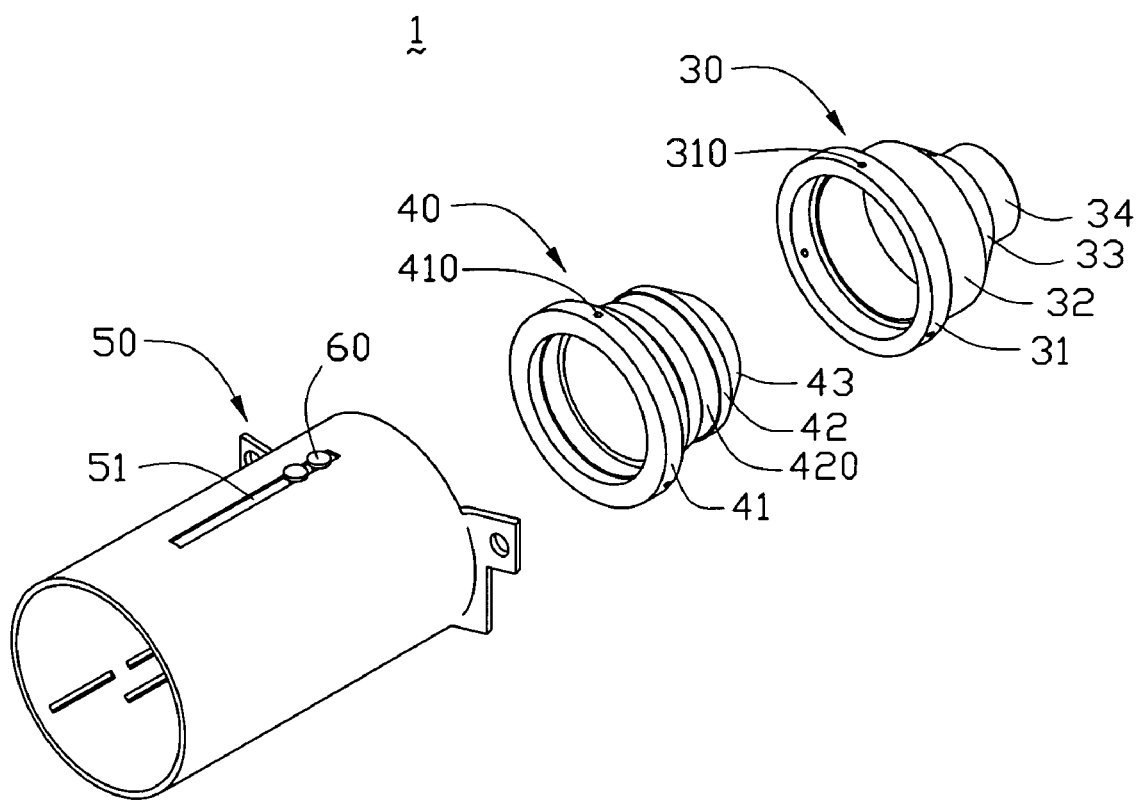
FIG. 3 is a schematic view of the zoom lens assembly in accordance with the present invention.

Referring to FIGS. 1A and 2A, the first internal barrel 30 and the second internal barrel 40 have the similar structures each which has a stepped barrel body with different internal and external diameters. Both the first internal barrel 30 and the second internal barrel 40 have the barrel bodies 31, 41 with first external diameters, respectively. The outer sidewalls of the two barrel bodies 31, 41 with respect to the guiding groove 51 of the lens holder 50 are both formed with the positioning holes 310, 410, respectively. Two bolts 60 are utilized to retain the first and second internal barrels 30, 40 within the lens holder 50 for connection wherein the tail of the bolts 60 is screwed through the positioning holes 310, 410 to expedite that the head of the bolts 60 is extended into the guiding groove 50 for guiding the barrels slid in the guiding groove.

A body portions 32 with a first internal diameter and a body portion 33 with a second internal diameter, both formed on the first internal barrel 30, and, respectively accommodates the second internal barrel 40. And, a body portion 34 with a third internal diameter accommodates the first lens group 10. The second lens group 20 is accommodated within the tube-shaped body of the second barrel 40. A body portion 42 with a second external diameter and a body portion 43 with a third external diameter, both formed on the second internal barrel 40, are accommodated within the body portions 32, 33 of the first internal barrel 30 with the first and second internal diameters, respectively. Notedly, the first external diameter 31 of the first internal barrel 30 is larger than the first, second, and third internal diameters 32, 33, 34 thereof, and the first external diameter 41 of the second internal barrel is larger than the second and third external diameter 42, 43 thereof.

Figure 4:
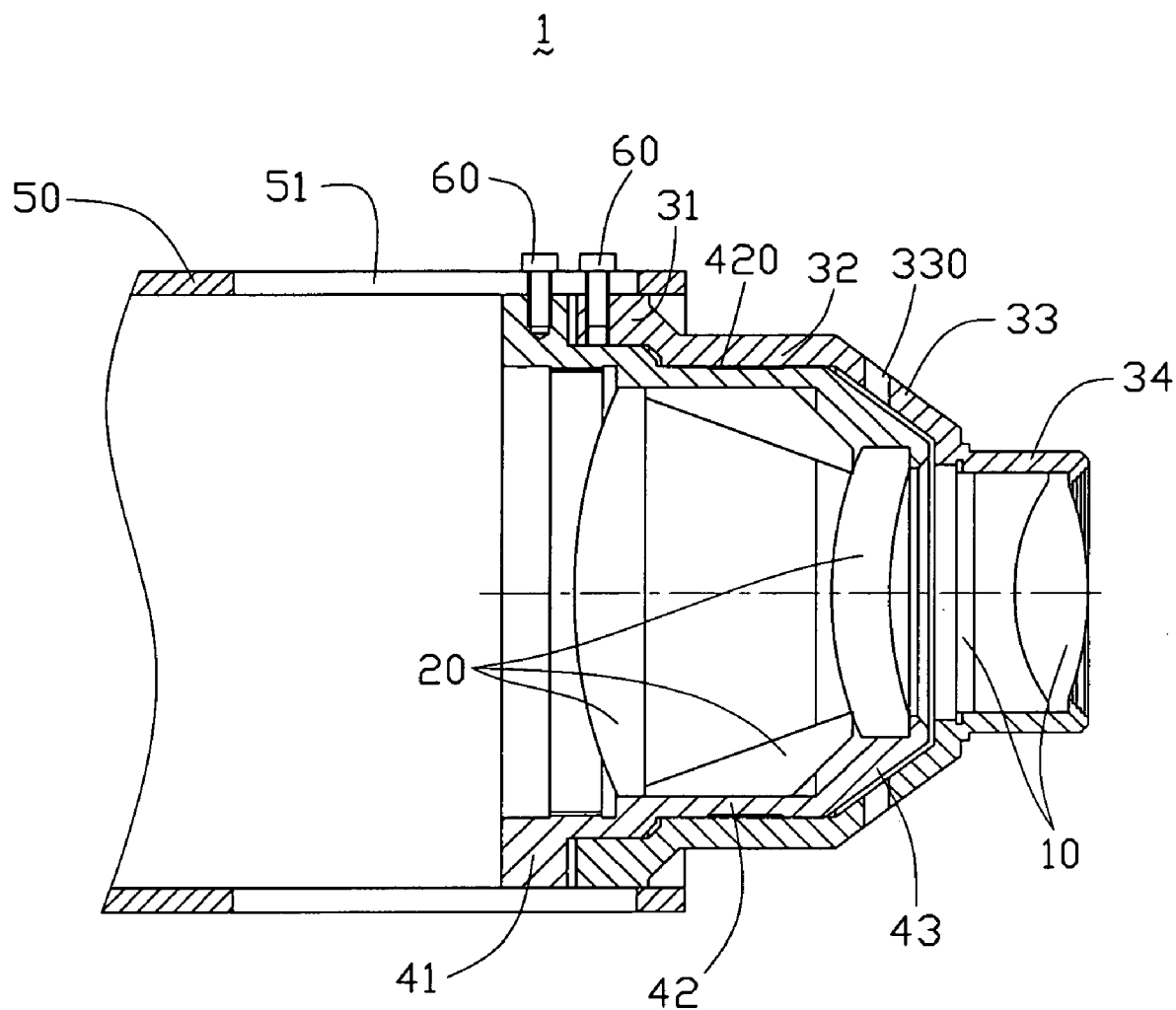
FIG. 4 is a cross-sectional view of the zoom lens assembly in accordance with the present invention.
Figure 5:
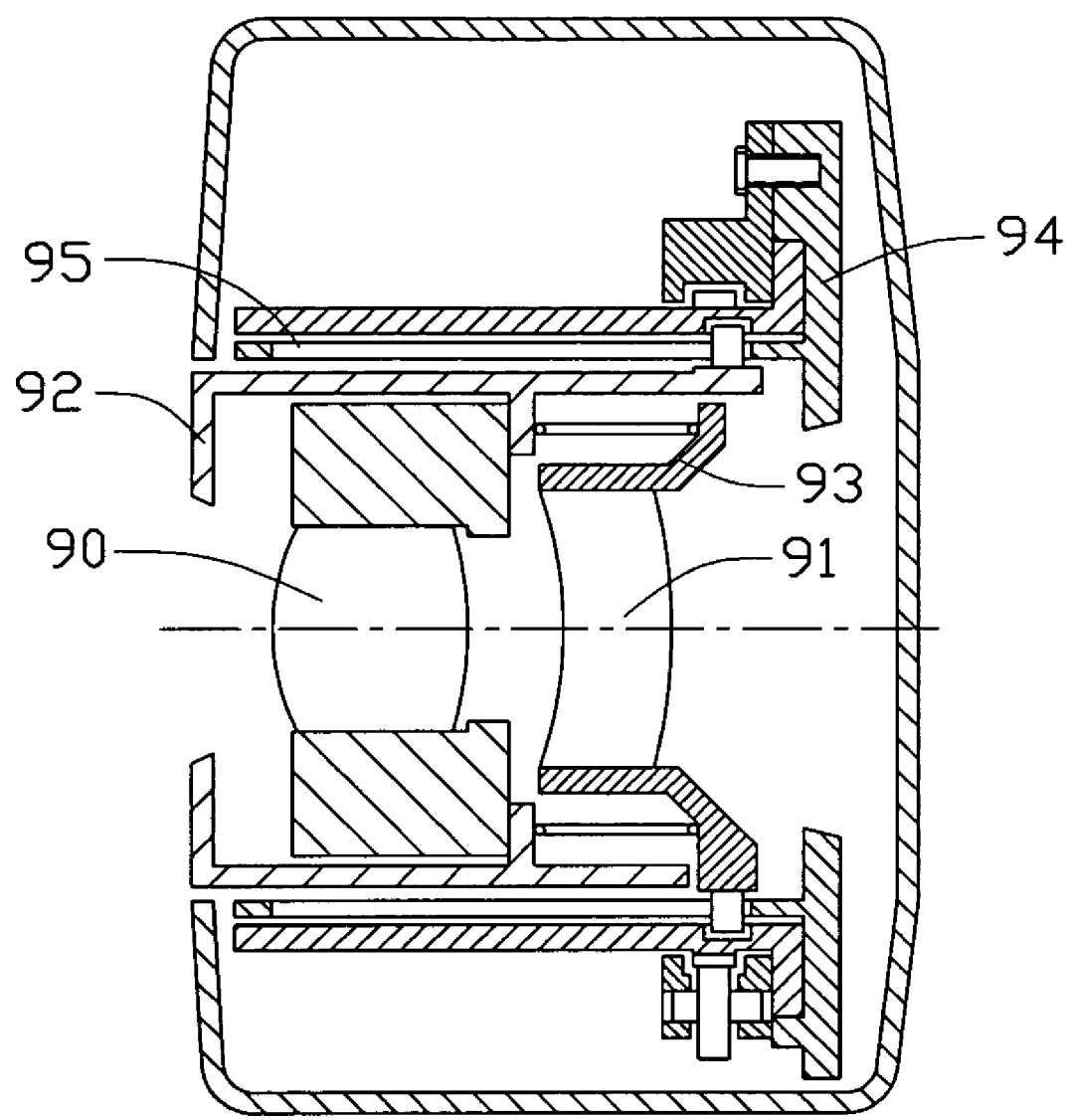
FIG. 5 is a schematic view of a conventional zoom lens assembly.

Further referring to the FIG. 4, the lens groups of the first and second internal barrel 30, 40 must be kept in the same axis, and specially on, it has to be assured that the front and rear lens groups are moved along the same optical axis. It is not only to expedite the first external diameters of the two internal barrels 30, 40 abutting against the inner sidewalls of the lens holder 50 closely thereby conforming precisely with each other and performing a telescopic movement along the guiding groove, but also keep the two internal barrels 30, 40 precisely coupled and moved in order to make the lens groups coaxial. Accordingly, the first internal diameter 32 of the first internal barrel is approximated to the second external diameter 42 of the second internal barrel 40. However, for the purpose of avoiding the contact surfaces of the two internal barrels 30, 40 from sticking mutually since precisely coupled, a groove 420 with a proper depth is formed on an outer surface of a body portion with second external diameter 42 of the second internal barrel 40 for creating a proper gap on a area between the two contact surfaces thereof. The groove 420 can help to increase the compactness of the coupled surfaces and diminish the sliding friction. This is good for the relative movement between the two barrels.

Furthermore, the second internal diameter 33 of the first internal barrel 30 is slightly larger than the third external diameter 43 of the second internal barrel 40 thereby forming a proper gap between the precisely coupled body portions 33, 43. The air will get into or escape from a space defined between the two lens groups 10, 20 while the two lens sets are moving relatively to make the space become larger or smaller. Thus, it is necessary to form some vents 330 on the sidewalls of the body portion 33 of the first internal barrel with the second internal diameter for eliminating the air pressure differential between two lens sets to help the lens sets sliding smoothly.

Following the above description, it is obviously understandable that the assembled process of the zoom lens assembly I according to the present invention is realized with two alignment procedures. The first alignment procedure comprises the following steps of: assembling the first and second lens sets, firstly and keeping the front and rear lens groups placed with the same axis, by way of precisely coupling between the two lens sets. The second alignment procedure comprises the steps of: mounting and retaining the finished lens sets on the lens holder and allowing the lens sets being slid therein by the corresponding fastening parts (such as bolts). It should be understood that this embodiment uses two alignment elements to achieve the above objects of the present invention wherein the first alignment element is formed between the two internal barrels 30, 40 to assure that the front and rear lens groups be kept in the same axis while moving respectively. The second alignment element can mount the two lens sets on the lens holder 50 and allow the lens sets to slide therein. The second alignment element further comprises some mating structures (such as positioning holes 310, 410) formed on between the two internal barrels 30, 40, a guiding groove 51 formed on the lens holder 50, and some fastening parts (such as bolts 60) interconnecting between the mating structures and the guiding groove. The assembled process according to the present invention is substantially simplified and adjustable easily. Furthermore, since each lens group is integrated into a single body before mounted on the lens holder, the stability of the assembled process can be improved and the lens groups can be kept in the same axis steadily during either moved relatively or assembled thereby increasing the optical qualities of the zoom lens assembly.

In addition, it is obviously noted that the guiding groove formed on the external barrel directly may be not necessary, but instead of the other ways to reach the sliding function. The fastening parts are not limited to the bolts but varied upon the requirement. Although the zoom lens assembly disclosed by the embodiment comprises two lens groups, the assembled structure according to the present invention, which keeps the lens groups concentric and coaxial, can be applied to other lens assemblies with multiple lens groups.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A zoom lens assembly, comprising:
    a first and second lens sets each defined with at least one internal barrel and a corresponding lens group disposed within said internal barrel wherein one of the internal barrels disposed with the lens group is accommodated within the other internal barrel disposed with another lens group;
    a lens holder accommodating the first and second lens sets therein; and
    an alignment element for keeping the lens groups of the lens sets coaxial, including:
    a mating structure formed between the two internal barrels to function coupled precisely;
    a sliding device having at least a fastening device capable of interconnecting the mating structure of the two lens sets to a guiding groove formed on the lens holder, thereby facilitating slide of the lens sets within the lens holder; and
    a part contour of each of the two internal barrels and a corresponding inner sidewall formed on the lens holder, both which are coupled closely;
    wherein the lens groups are divided into a first and second lens groups, the internal barrels are divided into a first and second internal barrels each having a step-shaped barrel body with different internal diameters and external diameters, and the first and second internal barrels each include a body portion with a first external diameter, and an outer sidewall defined on the body portion is shaped for coupling precisely between the internal barrel and the corresponding inner sidewall of the lens holder.

2. The zoom lens assembly as claimed in claim 1, wherein the mating structure of the alignment element further includes a positioning hole formed on the outer sidewalls of the body portions of each of the internal barrels with first outer diameter.

3. The zoom lens assembly as claimed in claim 2, wherein the fastening device is a bolt having a tail for being screwed into the positioning hole, and a head for being extended into the guiding groove of the lens holder.

4. The zoom lens assembly as claimed in claim 1, wherein the first internal barrel further has a body portion with a first internal diameter, and the second internal barrel further has a body portion with a second external diameter matched with the first internal diameter of the first internal barrel whereby the body portion of the second internal barrel with the second external diameter is accommodated within the body portion of the first internal barrel with the first internal diameter as soon as the first and second lens sets are assembled together.

5. The zoom lens assembly as claimed in claim 4, wherein the first internal barrel further has a body portion with a second internal diameter, and the second internal barrel further has a body portion with a third external diameter slightly smaller than the second internal diameter of the first internal barrel thereby defining a gap between the coupled body portions with the second internal and third external diameters after the two internal barrel assembled.

6. The zoom lens assembly as claimed in claim 5, wherein the first internal barrel further has a body portion with a third internal diameter for accommodating the first lens group therein, and the second lens group is accommodated within a corresponding structure defined on a body portion of the second internal barrel with the second and third external diameter.

7. The zoom lens assembly as claimed in claim 4, wherein a groove with proper depth is formed on an outer surface of the body portion of the second internal barrel with the second external diameter.

8. The zoom lens assembly as claimed in claim 5, wherein at least one vent is formed on sidewalls of the body portion of the first internal barrel with the second internal diameter.

9. A method for fabricating a zoom lens assembly with a plurality of concentric lens groups divided into at least a first and second lens groups, comprising the steps of:
    a. Mounting respectively the first and second lens groups on a first and second internal barrels to constitute a first lens set and a second lens set;
    b. Assembling the first and second lens sets together by performing a first alignment comprising: disposing the second internal barrel mounted with the second lens group into the first internal barrel mounted with the first lens group, and utilizing at least a coupled structure defined between the two internal barrels to precisely couple both the internal barrels thereby assuring each lens group coaxial during activity;
    c. Mounting the first and second lens sets assembled together on a lens holder by performing a second alignment which utilizes a portion defined on each of the internal barrels to abut against a respective inner sidewall formed on the lens holder, and
    d. Mounting the two lens sets on the lens holder by the plurality of fastening devices wherein a portion of each of the fastening devices is mounted into a corresponding positioning hole defined on the internal barrel, and the other portion of the fastening device is disposed on the guiding groove of the lens holder thereby facilitating slide of the lens sets, with the same axis, on the lens holder.

10. The method as claimed in claim 9, wherein each of the internal barrels has a step-shaped barrel body with different internal diameters and external diameters, and a body portion with first external diameter.

11. The method as claimed in claim 10, wherein the positioning hole of each of the internal barrels is formed on an outer sidewall of the body portion with the first external diameter, and the fastening devices are bolts having a tail for being screwed into the positioning hole and a head for being extended into the guiding groove of the lens holder.

12. The method as claimed in claim 9, wherein the first internal barrel further has a body portion with a first internal diameter, the second internal barrel further has a body portion with a second external diameter matched with the first internal diameter of the first internal barrel whereby the body portion of the second internal barrel with a second external diameter is accommodated within the body portion of the first internal barrel with the first internal diameter as soon as the first and second lens sets are assembled together.

13. The method as claimed in claim 11, wherein the first internal barrel further has a body portion with a first internal diameter, the second internal barrel further has a body portion with a second external diameter matched with the first internal diameter of the first internal barrel whereby the body portion of the second internal barrel with a second external diameter is accommodated within the body portion of the first internal barrel with the first internal diameter as soon as the first and second lens sets are assembled together.

14. The method as claimed in claim 12, wherein the first internal barrel further has a body portion with a second internal diameter, the second internal barrel further has a body portion with a third external diameter slightly smaller than the second internal diameter of the first internal barrel thereby forming a gap between the coupled body portions after the two internal barrel are assembled.

15. The method as claimed in claim 13, wherein the first internal barrel further has a body portion with a second internal diameter, the second internal barrel further has a body portion with a third external diameter slightly smaller than the second internal diameter of the first internal barrel thereby forming a gap between the coupled body portions after the two internal barrel are assembled.

16. The method as claimed in claim 14, wherein a groove with proper depth is formed on an outer surface of the body portion of the second internal barrel with the second external diameter, and a plurality of vents are formed on sidewalls of the body portion of the first internal barrel with the second internal diameter.

17. The method as claimed in claim 15, wherein a groove with proper depth is formed on an outer surface of the body portion of the second internal barrel with the second external diameter, and a plurality of vents are formed on sidewalls of the body portion of the first internal barrel with the second internal diameter.

18. A zoom lens assembly capable of keeping a plurality of lens groups concentric during activity, comprising:

a plurality of lens groups having of a plurality of lenses; and a plurality of internal barrels respectively accommodating said corresponding lens groups therein to constitute a plurality of lens sets wherein at least a part of one of the internal barrels is accommodated within the other internal barrel, and at least a coupled structure defined between the two internal barrels precisely couples the two internal barrels thereby assuring said lens groups being coaxial during activity;

wherein at least one of the precisely coupled internal barrels has a vent formed thereon for allowing air to escape to eliminate pressure differentials occurred between the interior and exterior during the lens sets being telescoped.

19. The zoom lens assembly as claimed in claim 18, wherein a groove with a proper depth is defined on sliding surfaces formed between the two precisely coupled barrels for increasing the compactness of the coupled surfaces and diminishing the sliding friction.

20. The zoom lens assembly as claimed in claim 19, wherein at least an internal barrel has a positioning hole formed on an outer sidewall thereof.

21. The zoom lens assembly as claimed in claim 20, further comprising a lens holder for containing said lens sets, wherein a guiding groove is formed on the lens holder, and at least a portion of a lens set is against an inner sidewalls of the lens holder for allowing the lens sets being relatively sliding inside the lens holder.

22. The zoom lens assembly as claimed in claim 21, further comprising at least a fastening device for connecting the positioning hole of the internal barrel with the guiding groove on the lens holder.

* * * * *